United States Patent
Damnjanovic et al.

(10) Patent No.: US 11,706,700 B2
(45) Date of Patent: *Jul. 18, 2023

(54) MEDIUM ACCESS CONTROL LAYER BASED MOBILITY SIGNALING

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/363,943

(22) Filed: Jun. 30, 2021

(65) Prior Publication Data
US 2022/0007272 A1    Jan. 6, 2022

Related U.S. Application Data

(60) Provisional application No. 63/047,756, filed on Jul. 2, 2020.

(51) Int. Cl.
*H04W 48/16*    (2009.01)

(52) U.S. Cl.
CPC .................................. *H04W 48/16* (2013.01)

(58) Field of Classification Search
CPC .. H04W 48/16; H04W 48/12; H04W 36/0061
See application file for complete search history.

(56) References Cited

U.S. PATENT DOCUMENTS

| 2015/0249972 A1 | 9/2015 | You et al. |
| 2016/0337911 A1 | 11/2016 | Engstrom et al. |
| 2018/0279182 A1 | 9/2018 | Sang et al. |
| 2022/0007352 A1* | 1/2022 | Damnjanovic ... H04W 36/0055 |

OTHER PUBLICATIONS

Ericsson: "Lower-Layer Mobility Enhancements", 3GPP Draft, 3GPP TSG-RAN WG1 Meeting #96, R1-1902528 Lower-Layer Mobility Enhancements, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019- -Mar. 1, 2019, Feb. 15, 2019, (Feb. 15, 2019), XP051600224, 8 Pages.
International Search Report and Written Opinion—PCT/US2021/040066—ISA/EPO—dated Nov. 4, 2021.

* cited by examiner

*Primary Examiner* — Diane D Mizrahi
(74) *Attorney, Agent, or Firm* — Patterson + Sheridan, L.L.P.

(57) ABSTRACT

Aspects of the present disclosure provide a method for wireless communications by a user equipment (UE). The method generally includes receiving radio resource control (RRC) signaling indicating a set of cells that support physical (PHY) layer or medium access control (MAC) layer mobility signaling, receiving at least one MAC control element (CE) indicating mobility information for the set of cells, and updating one or more features of the set of cells based on the MAC CE.

30 Claims, 14 Drawing Sheets

US 11,706,700 B2

MEDIUM ACCESS CONTROL LAYER BASED MOBILITY SIGNALING

PRIORITY CLAIM(S)

This application claims benefit of and the priority to U.S. Provisional Application No. 63/047,756, filed on Jul. 2, 2020, which is expressly incorporated by reference in its entirety as if fully set forth below and for all applicable purposes.

TECHNICAL FIELD

Aspects of the present disclosure relate to wireless communications, and more particularly, to mobility techniques that allow for dynamically updating a set of cells activated to serve a user equipment (UE), and associated information, based on a medium access control (MAC) control element (CE).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

Certain aspects of the present disclosure are directed to a method for wireless communication by a user equipment (UE). The method generally includes receiving radio resource control (RRC) signaling indicating a set of cells that support physical (PHY) layer or medium access control (MAC) layer mobility signaling, receiving at least one MAC control element (CE) indicating mobility information for the set of cells, and updating one or more features of the set of cells based on the MAC CE.

Certain aspects of the present disclosure are directed to an apparatus for wireless communication by a UE. The apparatus generally includes a memory and at least one processor coupled to the memory, the memory and the at least one processor being configured to receive RRC signaling indicating a set of cells that support PHY layer or MAC layer mobility signaling, receive at least one MAC CE indicating mobility information for the set of cells, and update one or more features of the set of cells based on the MAC CE.

Certain aspects of the present disclosure are directed to an apparatus for wireless communication by a UE. The apparatus generally includes means for receiving RRC signaling indicating a set of cells that support PHY layer or MAC layer mobility signaling, means for receiving at least one MAC CE indicating mobility information for the set of cells, and means for updating one or more features of the set of cells based on the MAC CE.

Certain aspects of the present disclosure are directed to a computer readable medium having instructions stored thereon for receiving RRC signaling indicating a set of cells that support PHY layer or MAC layer mobility signaling, receiving at least one MAC CE indicating mobility information for the set of cells, and updating one or more features of the set of cells based on the MAC CE.

Certain aspects of the present disclosure are directed to a method for wireless communication by a network entity. The method generally includes sending a UE RRC signaling indicating a set of cells that support PHY layer or MAC layer mobility signaling, sending the UE at least one MAC CE indicating mobility information for the set of cells, and communicating with the UE via a subset of the cells that are activated with one or more features of the set of cells based on the MAC CE.

Certain aspects of the present disclosure are directed to an apparatus for wireless communication by a network entity. The apparatus generally includes a memory and at least one processor coupled to the memory, the memory and the at least one processor being configured to send a UE RRC signaling indicating a set of cells that support PHY layer or MAC layer mobility signaling, send the UE at least one MAC CE indicating mobility information for the set of cells, and communicate with the UE via a subset of the cells that are activated with one or more features of the set of cells based on the MAC CE.

Certain aspects of the present disclosure are directed to an apparatus for wireless communication by a network entity. The apparatus generally includes means for sending a UE RRC signaling indicating a set of cells that support PHY layer or MAC layer mobility signaling, means for sending the UE at least one MAC CE indicating mobility information for the set of cells, and means for communicating with the UE via a subset of the cells that are activated with one or more features of the set of cells based on the MAC CE.

Certain aspects of the present disclosure are directed to a computer readable medium having instructions stored thereon for sending a UE RRC signaling indicating a set of cells that support PHY layer or MAC layer mobility signaling, sending the UE at least one MAC CE indicating mobility information for the set of cells, and communicating with the UE via a subset of the cells that are activated with one or more features of the set of cells based on the MAC CE.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for dynamically updating a set of cells and/or beams that are activated to serve a user equipment (UE). As will be described in greater detail below, the set of activated cells may be updated based on medium access control (MAC) layer (Layer2 or L2) signaling that indicates one or more cells to activate and/or de-activate. The MAC control element (CE) may also carry activation of radio resource control (RRC) preconfigured options to be used to update system information (SI).

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
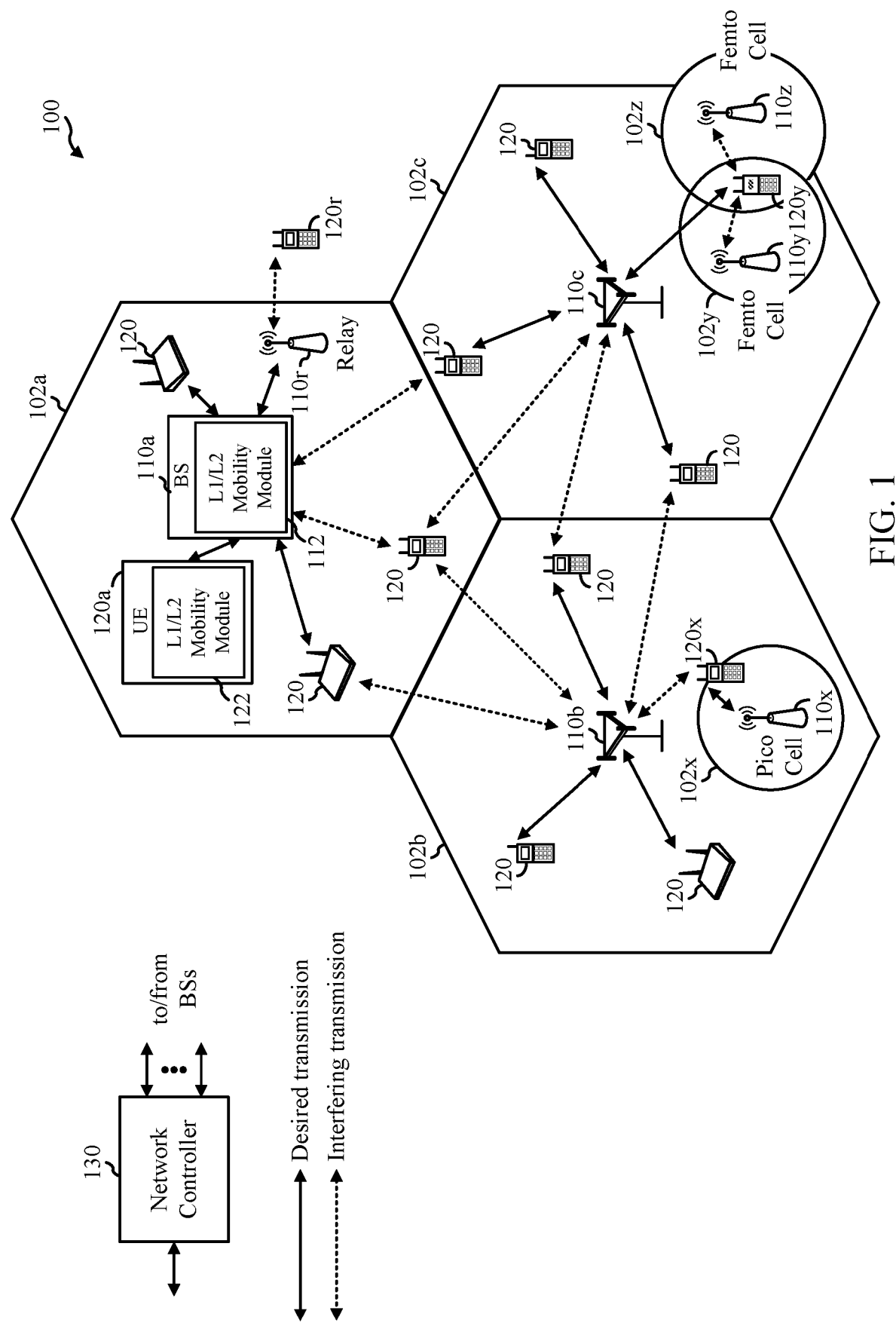
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an L1/L2 mobility module 122 that may be configured to perform (or cause UE 120a to perform) operations 800 of FIG. 8. Similarly, a BS 110a may include an L1/L2 mobility module 112 that may be configured to perform (or cause BS 110a to perform) operations 900 of FIG. 9.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (e.g., a slot or subframe) or frequency-domain resource (e.g., component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data or other information from an upstream station (e.g., a BS 110a or a UE 120r) and sends a transmission of the data or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
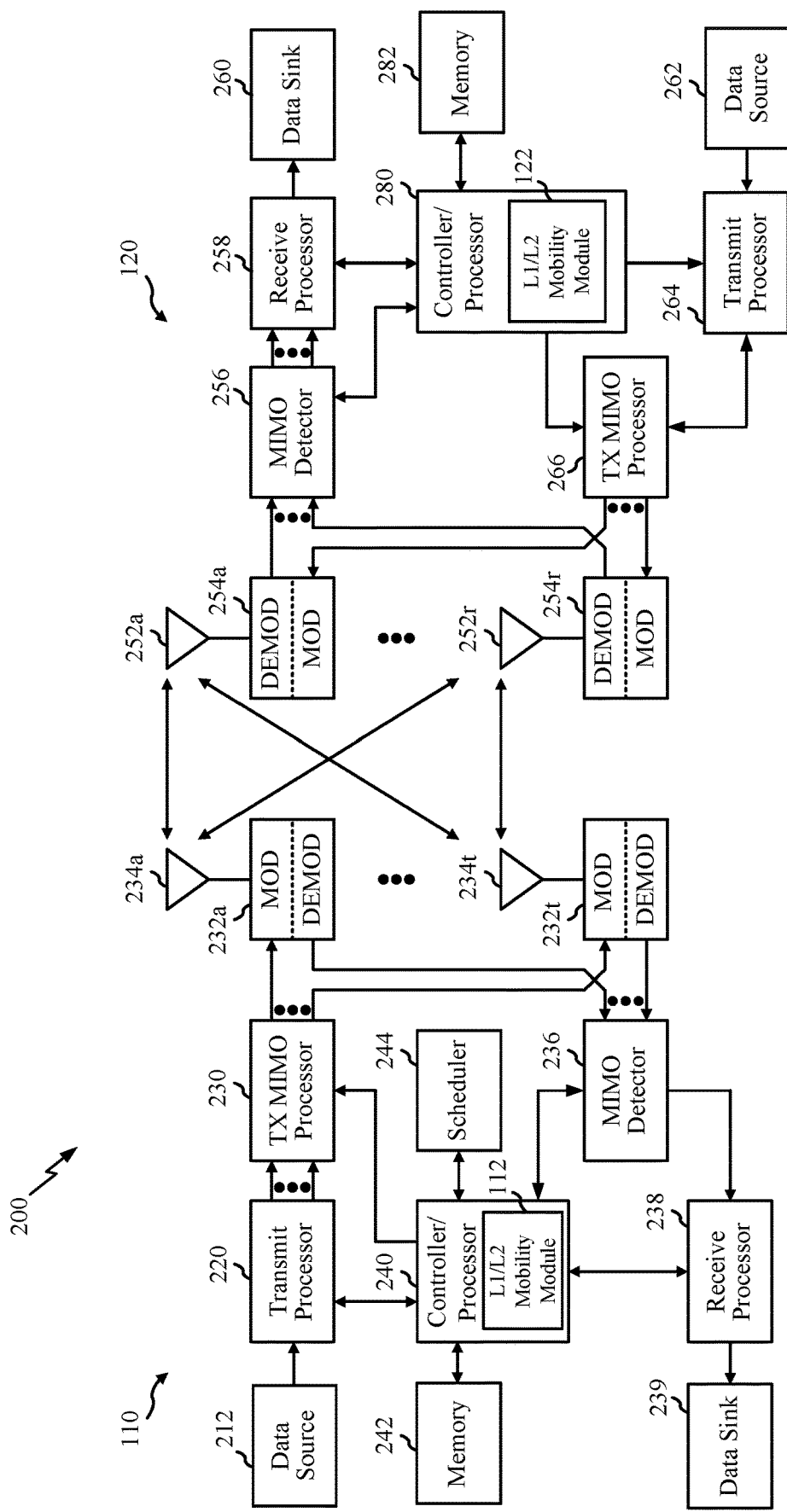
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has an L1/L2 mobility module 122 that may be configured to perform (or cause UE 120 to perform) operations 800 of FIG. 8. Similarly, the BS 110a may include an L1/L2 mobility module 112 that may be configured to perform (or cause BS 110a to perform) operations 900 of FIG. 9.

Figure 3A:
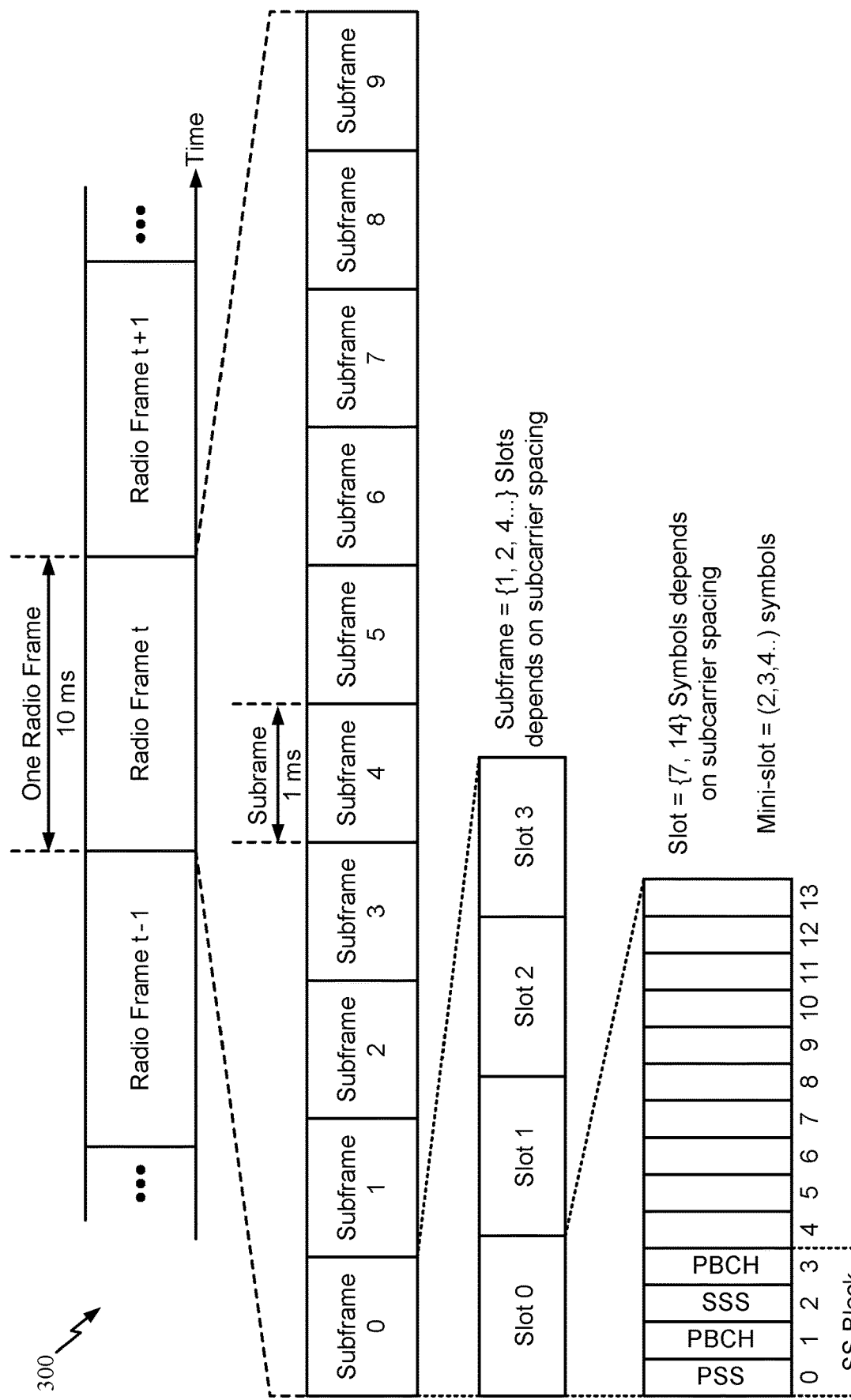
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
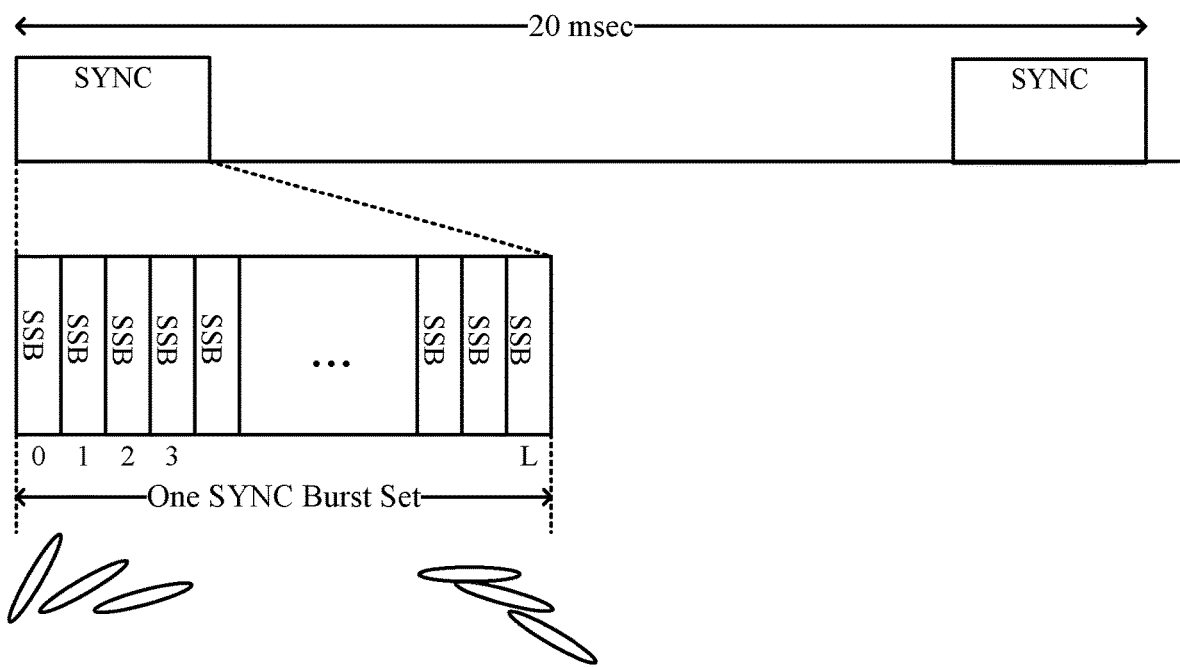
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Medium Access Control Layer Based Mobility Signaling

Aspects of the present disclosure relate to wireless communications, and more particularly, to mobility techniques that allow for dynamically updating a set of cells and/or beams activated to serve a user equipment (UE). As will be described in greater detail below, the set of activated cells may be updated based on physical (PHY) layer (Layer1 or L1) or medium access control (MAC) layer (Layer2 or L2) signaling that indicates one or more cells and/or beams to activate and/or de-activate.

The techniques presented herein may be applied in various bands utilized for new radio (NR). For example, for the higher band referred to as frequency range (FR) 4 (e.g., 52.6 GHz to 114.25 GHz), an orthogonal frequency division multiplexed (OFDM) waveform with very large subcarrier spacing (e.g., 960 kHz to 3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μs, while in FR4 with 960 kHz, the slot length is 15.6 μs.

In multi-beam operation (e.g., involving FR1 and FR2 bands), more efficient uplink/downlink beam management may allow for increased intra-cell and inter-cell mobility (e.g., L1 and/or L2-centric mobility) and/or a larger number of transmission configuration indicator (TCI) states. For example, the TCI states may include the use of a common beam for data and control transmission and reception for uplink and downlink operations, a unified TCI framework for uplink and downlink beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of physical layer (PHY, Layer1, or L1) or medium access control (MAC, Layer2, or L2) signaling, as opposed to higher layer (e.g., RRC) signaling.

Figure 4:
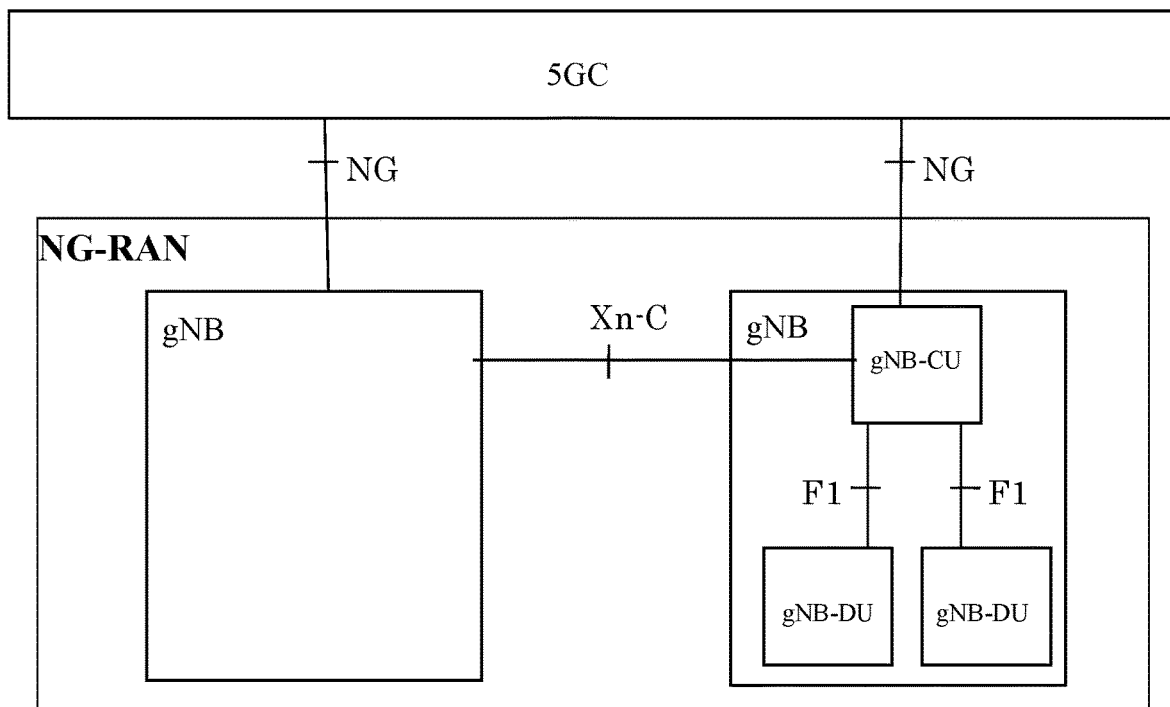
FIG. 4 illustrates an example architecture in which aspects of the present disclosure may be practiced.

FIG. 4 illustrates an example architecture in which aspects of the present disclosure may be practiced. As illustrated, the architecture includes a gNB central unit (gNB-CU). The gNB-CU generally serves as a logical node hosting RRC, service data adaptation protocol (SDAP), and packet data convergence protocol (PDCP) of the gNB that controls the operation of one or more gNB distributed units (gNB-DUs). As illustrated, the gNB-CU terminates an F1 interface connected with the gNB-DU.

Figure 5:
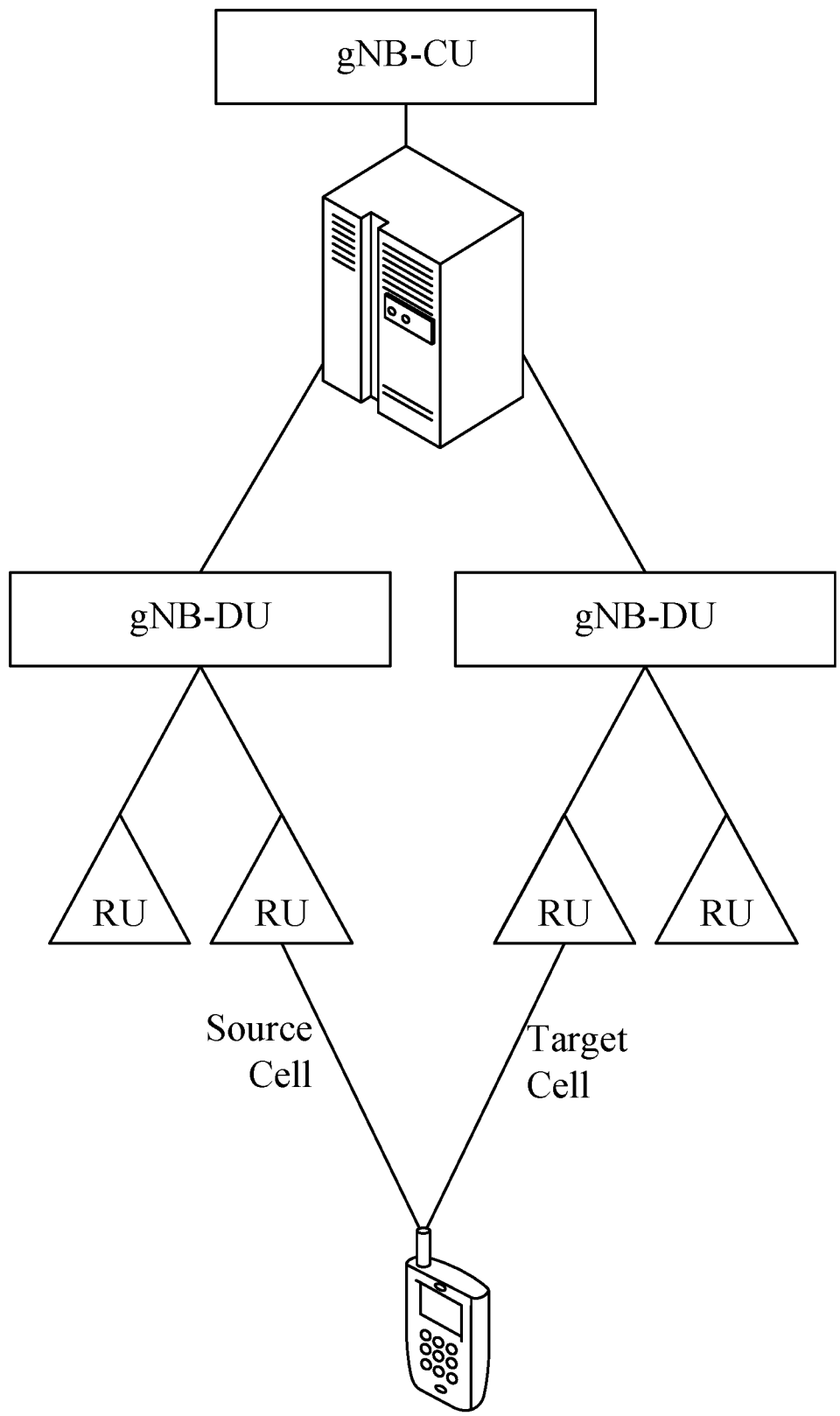
FIGS. 5 and 6 illustrate example scenarios in which aspects of the present disclosure may be practiced.
Figure 6:
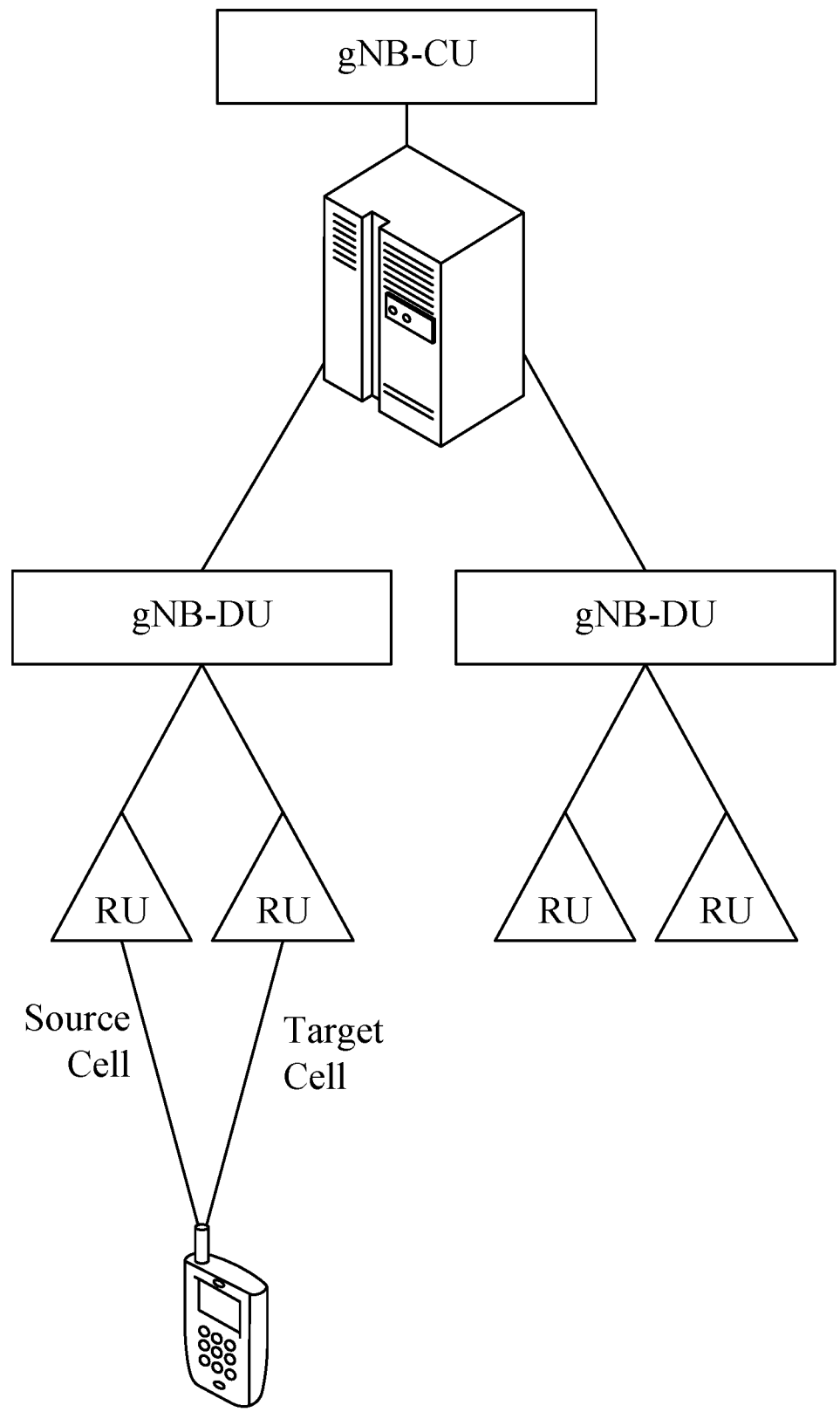

A gNB-DU generally serves as a logical node hosting RLC, MAC and PHY layers of the gNB, and its operation is controlled by gNB-CU. As illustrated in FIGS. 5 and 6, one gNB-DU supports one or multiple cells (but each cell is supported by only one gNB-DU. The gNB-DU terminates the F1 interface connected with the gNB-CU.

FIGS. 5 and 6 illustrate example scenarios in which aspects of the present disclosure may be practiced.

As illustrated in FIG. 5, in some cases, a UE may be handed over between (source and target) cells supported by (radio units or RUs of) different DUs under the same CU. The RUs generally contain only PHY layer logic. In the scenario of FIG. 5, the cells could have non-collocated (in different DUs) PHY, MAC, and RLC logic, but common PDCP and RRC logic (the same CU). While L1/L2 signaling techniques described herein may be used for mobility, the data path from PDCP to different RLCs present some control aspects that may be addressed by coordination between DUs.

In the scenario illustrated in FIG. 6, on the other hand, source and target cells are supported by (belong to) the same DU. Thus, L1/L2 mobility may be particularly attractive in this scenario, as the cells can share MAC and upper layers (same DU). In this scenario, when performing a handover via L1/L2 signaling, the data path at MAC and above stays the same.

As noted above, the distributed RUs contain only PHY layer and may be used (activated/de-activated) in a similar manner to carrier aggregation (CA), but cells may be on the same carrier frequencies. As such, aspects of the present disclosure, however, may utilize mechanisms similar to those used in CA to enable L1/L2 mobility (e.g., activating/de-activating cells to serve the UE).

Figure 7A:
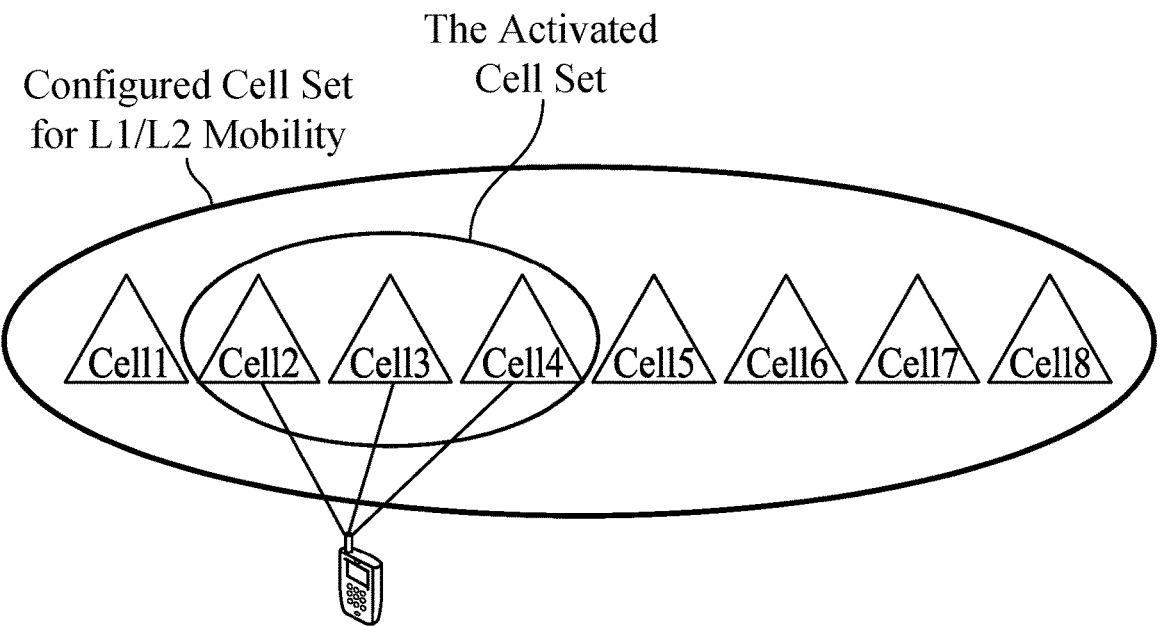
FIGS. 7A and 7B illustrate an example of UE mobility, in accordance with some aspects of the present disclosure.

As an initial step, RRC signaling may be used to configure a set of cells for L1/L2 mobility. As an illustration, FIG. 7A shows an example that assumes a configured set of 8 cells (Cell1, Cell2, ..., Cell8). In general, the cell set may be designed to be large enough to cover meaningful mobility (e.g., anticipated mobility of a UE within a given area and given time). As will be described below, mobility management may be performed by activating/de-activating cells in the set such that a subset of the cells are activated for serving the UE.

From the configured set, at any given time, a certain subset of cells may be activated for serving the UE. This set of activated cells generally refers to one or more cells in the configured set that are activated. If the set of activated cells includes two or more activated cells, the UE may be handed over from one activated cell to another activated cell via dynamic (PHY/MAC) signaling. In some cases, an active set may contain only one cell, such that when signaling is received to activate a new cell, the currently active serving cell may be put into a deactivated set. In other words, with such a scenario of active serving cell switching, there may be only one active serving cell at the time.

Referring again to FIG. 7A, the set of activated cells includes Cells 2-4. In some cases, the cells which are activated for any given UE may depend on UE-reported measurements. Configured cells that are not activated (e.g., a set of deactivated cells) may include the (remaining) group of cells in in the configured set that are deactivated (not activated). In FIG. 7A, the set of deactivated cells includes Cell 1 and Cells 5-8.

Aspects of the present disclosure may provide for mobility within the activated cells in the set of activated cells. In some cases, the signaling mechanism may be relatively similar to beam management. For example, mobility management within the activated set may be performed through L1/L2 signaling used to activate/deactivate cells in the activated and set of deactivated cells to select beams within the activated cells.

Figure 7B:
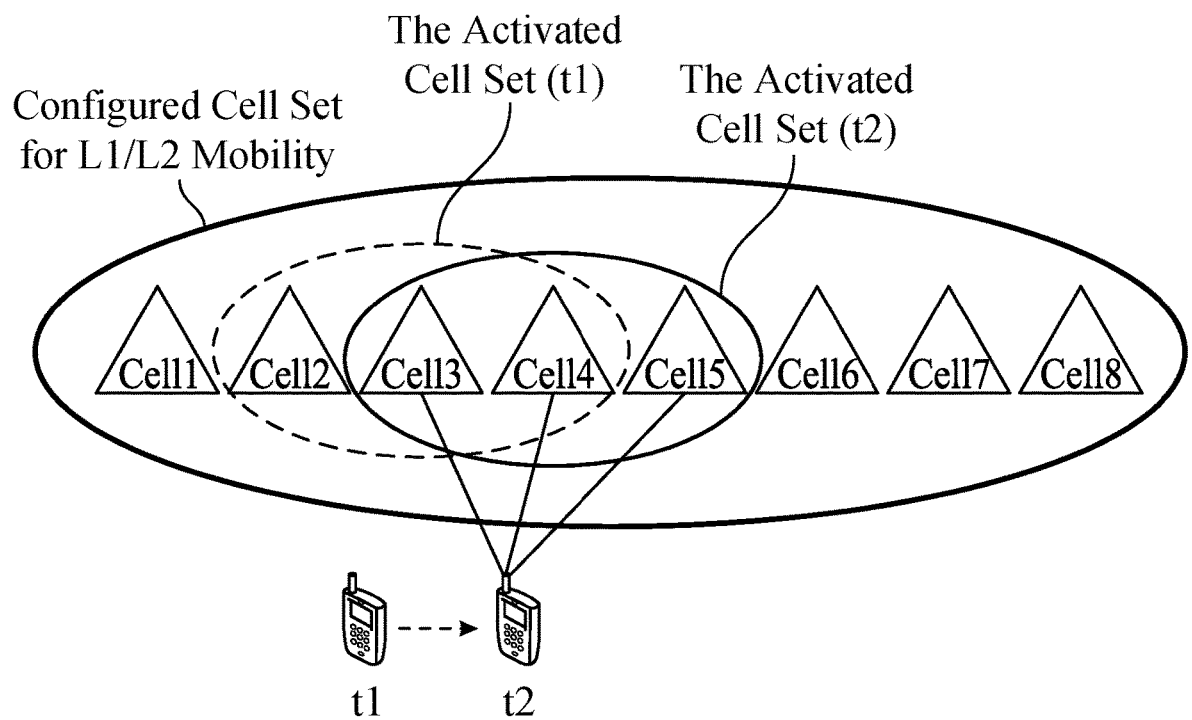

As illustrated in FIG. 7B, as the UE moves, cells from the set are deactivated and activated, for example, based on signal quality (measurements reported by the UE) and other considerations (e.g., loading of the cells). In the example shown in FIG. 9B, as the UE moves from left (at time t1) to right (at time t2), cell 5 (which is now closer) is activated and cell 2 (which is now farther) is de-activated. Thus, after the move, the set of activated cells includes Cell3, Cell4, and Cell5.

The cells that are activated/deactivated by L1/L2 signaling may be based on network control, UE recommendation, and/or a UE decision. In general, the L1/L2 signaling (e.g., DCI and/or MAC-CEs) could carry activation and/or deactivation commands (e.g., that indicate cells to be activated and cells to be deactivated). If a UE is capable of supporting only one activated cell at a time, an activation command indicating a new cell could implicitly deactivate a currently active cell (e.g. upon UE acknowledging the command). As noted above, in the case of the active set containing only one cell, when signaling is received to activate a new cell, the currently active serving cell may be put into deactivated set.

Aspects of the present disclosure may provide for mobility within a set of cells using MAC layer (L2) mobility signaling.

Figure 8:
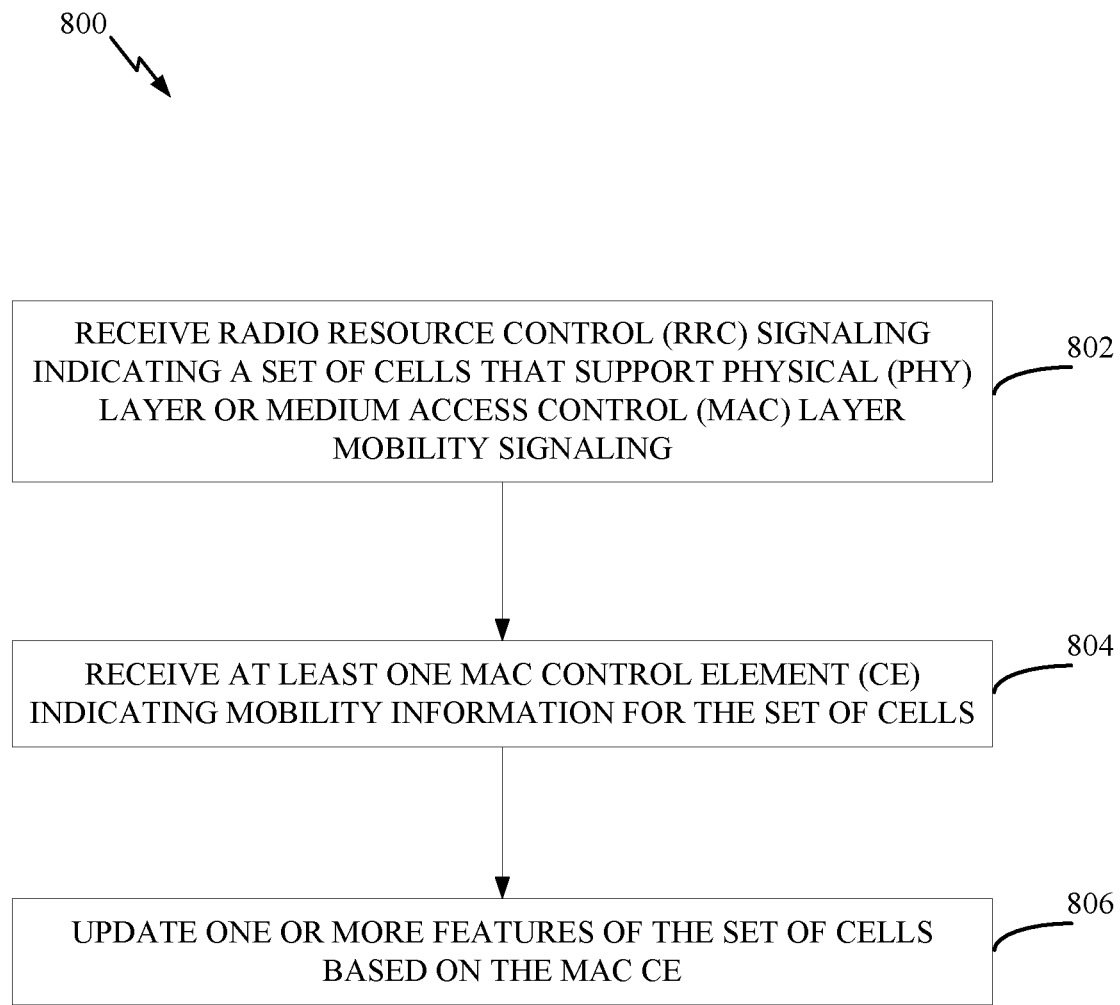
FIG. 8 illustrates example operations for wireless communication by a user equipment (UE), in accordance with some aspects of the present disclosure.

FIG. 8 illustrates example operations 800 that may be performed by a UE to identify an initial beam to use in communicating with a selected cell in L2-based mobility, in accordance with certain aspects of the present disclosure. Operations 800 may be performed, for example, by a UE 120 illustrated in FIG. 1.

Operations 800 begin, at 802, by receiving RRC signaling indicating a set of cells that support PHY layer or MAC layer mobility signaling. For example, the UE may be configured, via RRC signaling, with a set of cells that support MAC layer mobility, as shown in the examples of FIGS. 7A and 7B.

Figure 10A:
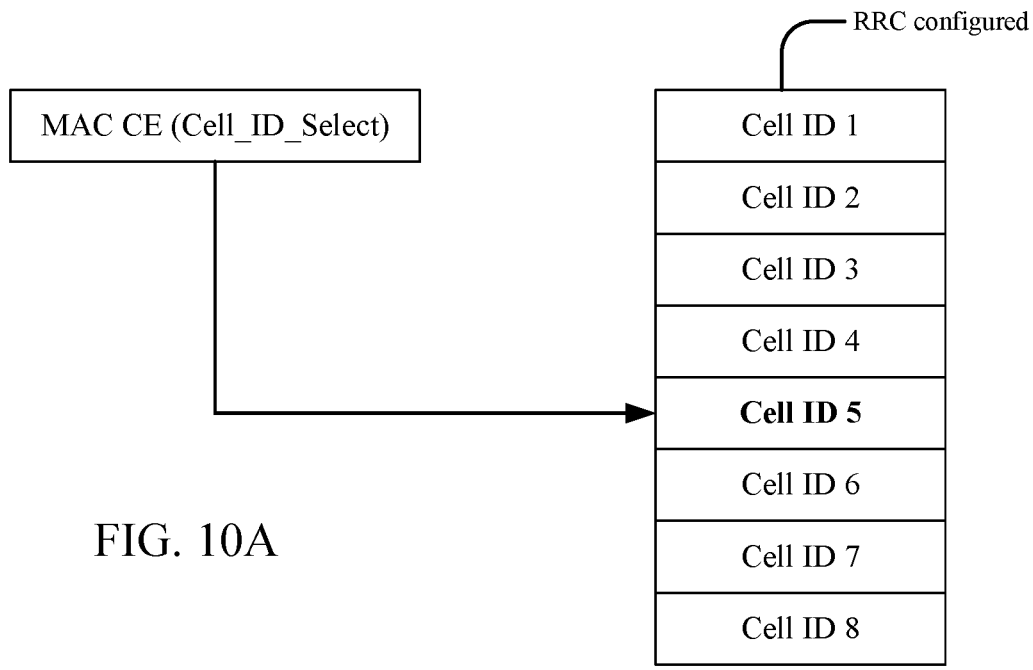
FIG. 10A illustrates an example of a MAC CE selection of a cell, in accordance with some aspects of the present disclosure.
Figure 10B:
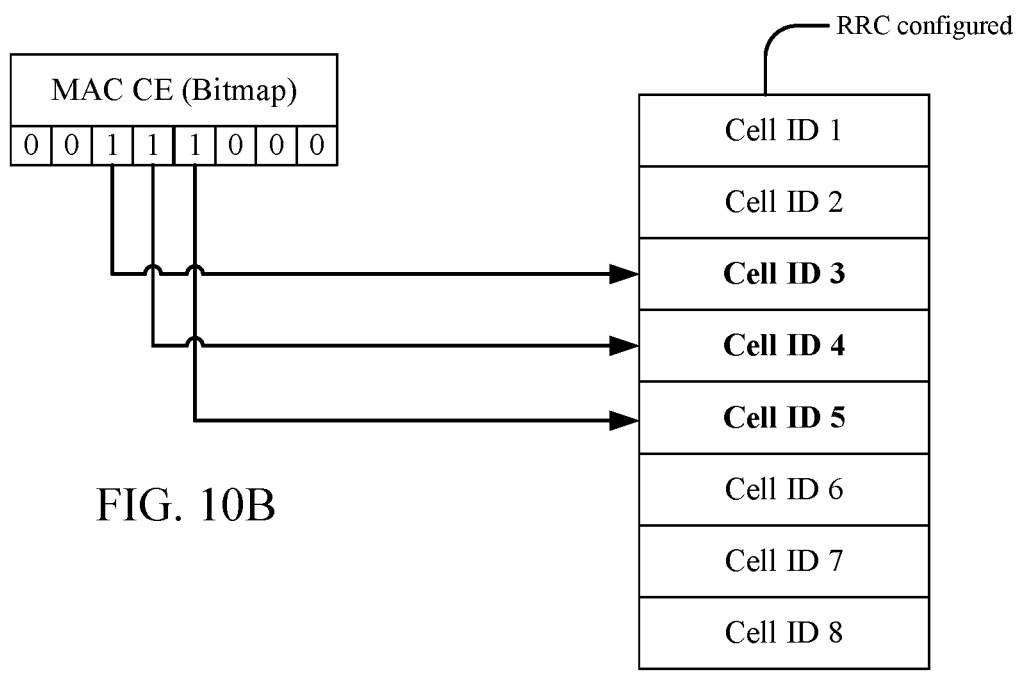
FIG. 10B illustrates another example of a MAC CE selection of a cell, in accordance with some aspects of the present disclosure.

At 804, the UE receives at least one MAC CE indicating mobility information for the set of cells. At 806, the UE updates one or more features of the set of cells based on the MAC CE. For example, as shown in FIGS. 10A and 10B, the MAC CE may indicate one or more of the configured cells to activate or deactivate. As another example, as shown in FIG. 11, the MAC CE could convey activation of RRC preconfigured options for system information (SI) updates.

Figure 9:
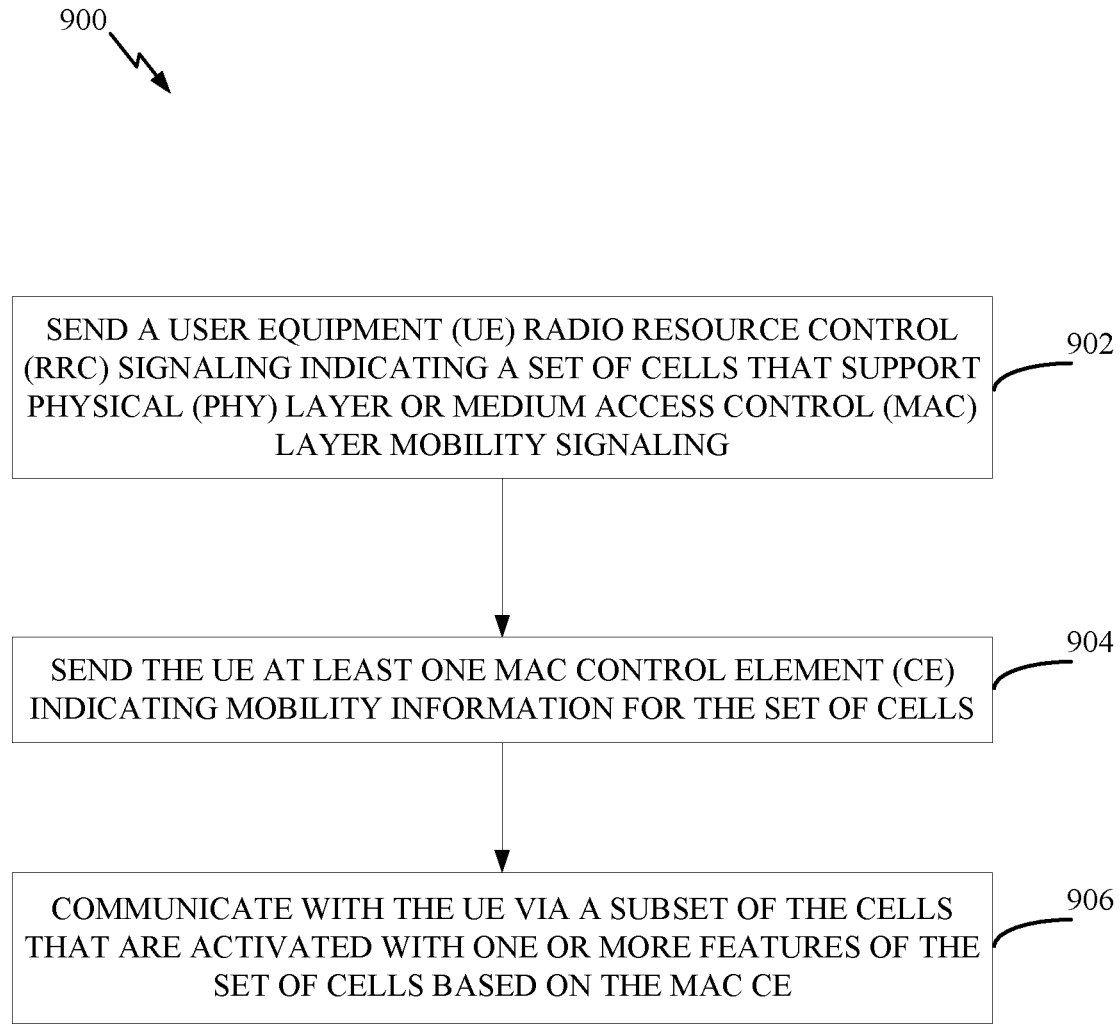
FIG. 9 illustrates example operations for wireless communication by a network entity, in accordance with some aspects of the present disclosure.

FIG. 9 illustrates example operations 900 that may considered complementary to operations 800 of FIG. 8. For example, operations 900 may be performed by a network entity (e.g., a gNB DU/CU) to dynamically activate cells and select beams to support mobility of a UE (performing operations 800 of FIG. 8).

Operations 900 begin, at 902, by sending a UE RRC signaling indicating a set of cells that support PHY layer or MAC layer mobility signaling. At 904, the network entity sends the UE at least one MAC CE indicating mobility information for the set of cells. At 906, the network entity communicates with the UE via a subset of the cells that are activated with one or more features of the set of cells based on the MAC CE.

Figure 11:
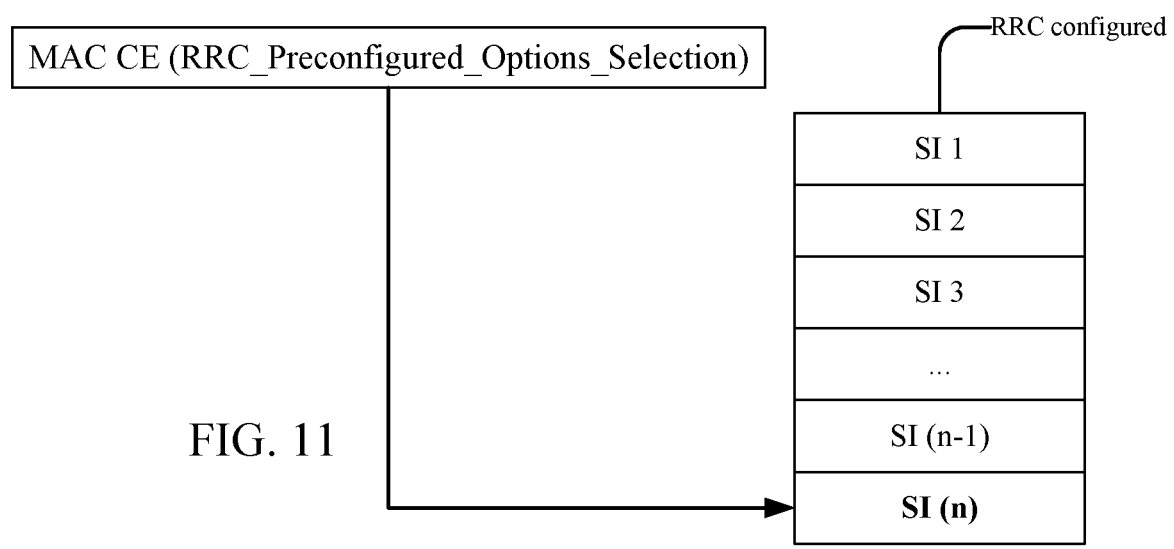
FIG. 11 illustrates an example of a MAC CE update of system information (SI), in accordance with some aspects of the present disclosure.

Operations 800 and 900 of FIGS. 8 and 9 may be further understood with reference to FIGS. 10A, 10B and 11 which illustrate examples of MAC CE-based mobility signaling, in accordance with aspects of the present disclosure.

As illustrated in FIGS. 10A and 10B, in some cases, a new MAC CE format may convey at least the ID information of the cell to be activated and/or deactivated from the configured cell set.

As illustrated in FIG. 10A, the MAC CE may include a field (e.g., Cell_ID_Select) with one or more bits that serve as a pointer to one of the cell IDs of the set of cells configured by RRC. Continuing with the example shown in FIGS. 7A and 7B, assuming the configured set has 8 cells, a 3-bit field may be used to indicate one of the cells to be activated or deactivated. The MAC CE shown in FIG. 10A, for example, may have been received by the UE of FIG. 7B at time t2 to activate Cell ID 5. In some cases, an extra bit may indicate whether the identified cell is activated or deactivated, or the indication could be implicit (e.g., if the identified cell is not activated, the UE may implicitly determine the MAC CE is for activation).

As illustrated in FIG. 10B, the MAC CE may include a bitmap, where each bit corresponds to one of the cell IDs of the set of the set of cells configured by RRC. While the bitmap represents additional overhead relative to the selection field of FIG. 10A, one advantage is the bitmap may be able to indicate multiple cells to be activated and/or deactivated. In the illustrated example, a value of 1 in the bitmap indicates a corresponding cell to be activated (or to maintain in an activated state), while a value of 0 in the bitmap indicates a corresponding cell to be deactivated (or to maintain in a deactivated state).

As illustrated in FIG. 11, in some cases, a MAC CE with mobility signaling could be used to update SI for one or more of the cells in the set. In the illustrated example, the MAC CE may have a field that is used to activate and/or deactivate a set of SI values, from different sets of SI values preconfigured via RRC signaling.

In some cases, SI information elements (IEs) that are eligible for update (e.g., via MAC layer signaling) may be arranged in a predefined order (when configured). This may allow those IEs to be addressed, for example, based on numbering or via a bitmap in the MAC CE.

In addition or as an alternative, MAC CE could activate some other RRC preconfigured options for one or more cells at their activation. For example, the options may relate to a timing advance group (TAG) timing advance (TA) information, a measurement configuration, and/or an update or change to a primary cell (PCell). In this manner, preconfigured options desired for a cell may be activated when that cell is activated.

In some cases, the MAC CE(s) for mobility signaling could carry one kind of information or be designed to carry multiple kinds of information in the context of (L1/L2) mobility for the cells in the configured set. For example, one MAC CE type may allow for system information updates, while another type of MAC CE may allow for measurements and TAG information changes.

Due to the importance of mobility signaling, the MAC CE(s) should be able to be sent to the UE without data. This may allow an update to the activated cell set, SI, and/or other options, without having to wait until the network has data for the UE.

For reliability, it may be desirable that the UE acknowledge the MAC CE. This could be accomplished by signaling through hybrid automatic repeat request (HARD) acknowledgment, a MAC CE, or a physical uplink control channel (PUCCH) with a cyclic redundancy check (CRC) that indicates the acknowledgment.

This L2-based signaling could be combined with L1-based signaling. This may be accomplished, for example, by transmitting to the UE at least one downlink control information (DCI) indicating mobility information for the set of cells (e.g., activating/deactivating a cell to serve the UE and/or updating corresponding features).

Example Communications Devices

Figure 12:
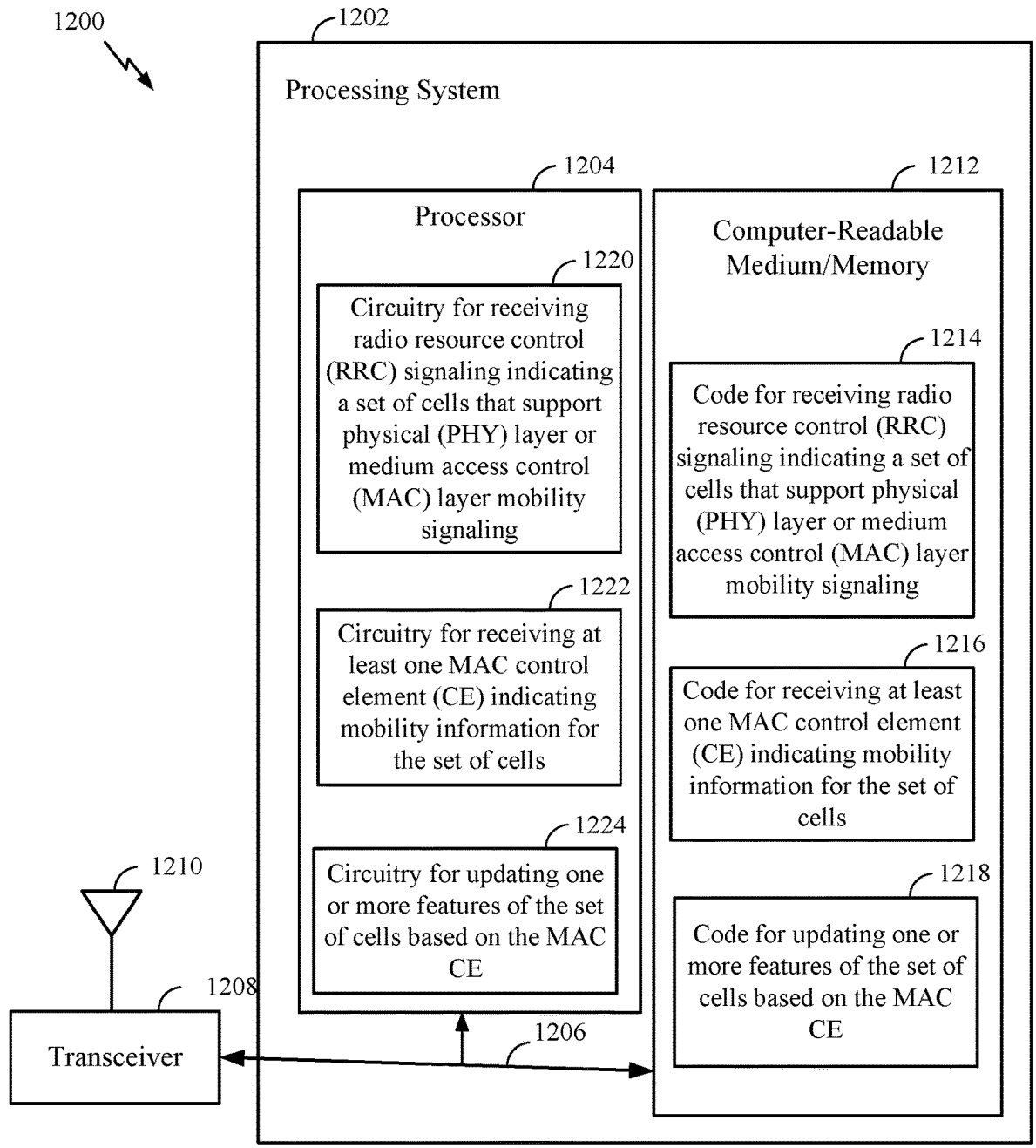
FIGS. 12 and 13 illustrate communications devices that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein. In certain aspects, computer-readable medium/memory 1212 stores code 1214 for receiving radio resource control (RRC) signaling indicating a set of cells that support physical (PHY) layer or medium access control (MAC) layer mobility signaling; code 1216 for receiving at least one MAC control element (CE) indicating mobility information for the set of cells; and code 1218 for updating one or more features of the set of cells based on the MAC CE. In certain aspects, the processor 1204 has circuitry configured to implement the code stored in the computer-readable medium/memory 1212. The processor 1204 includes circuitry 1220 for receiving RRC signaling indicating a set of cells that support PHY layer or MAC layer mobility signaling; circuitry 1222 for receiving at least one MAC CE indicating mobility information for the set of cells; and circuitry 1224 for updating one or more features of the set of cells based on the MAC CE.

Figure 13:
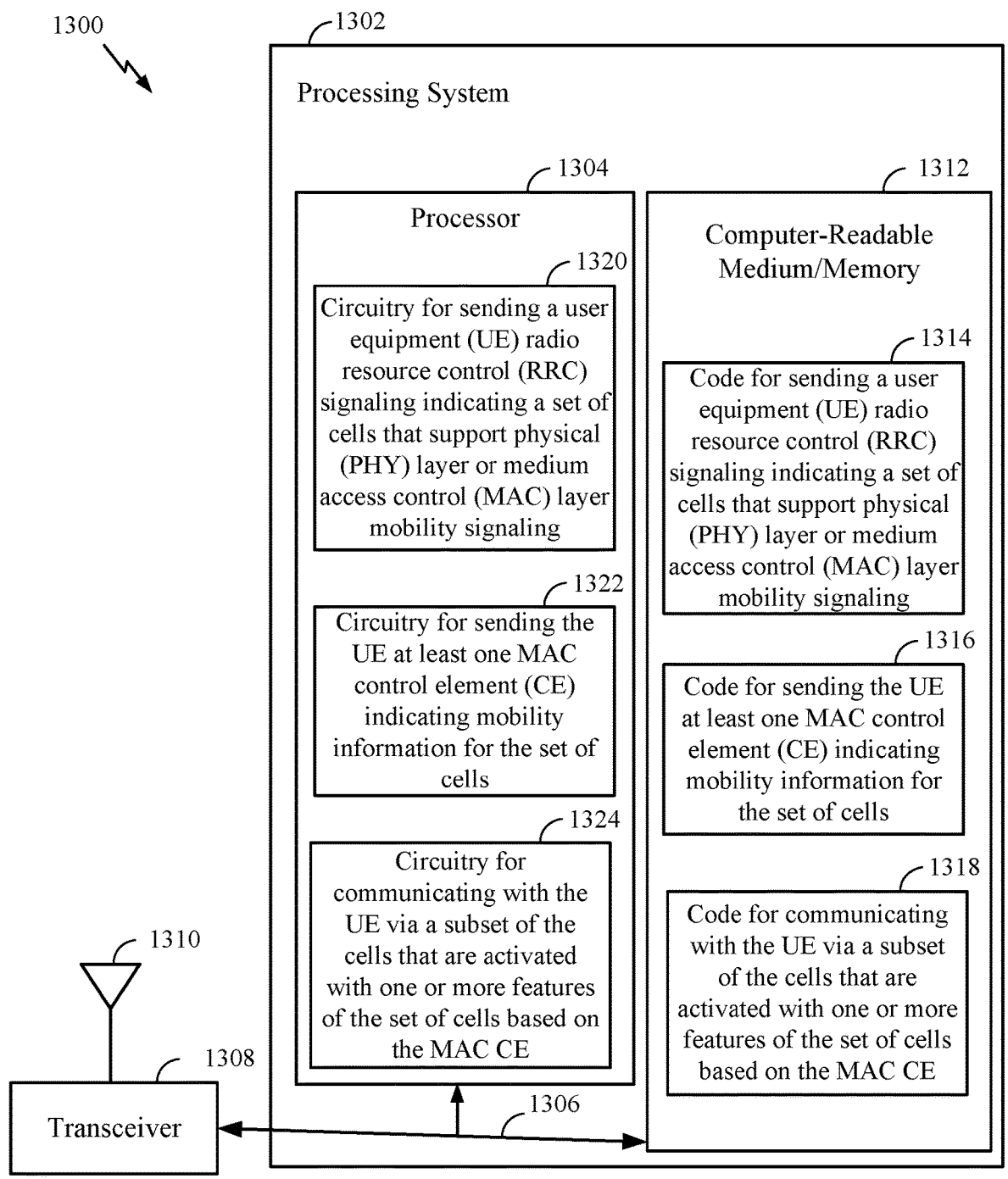

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein. In certain aspects, computer-readable medium/memory 1312 stores code 1314 for sending a UE RRC signaling indicating a set of cells that support PHY layer or MAC layer mobility signaling; code 1316 for sending the UE at least one MAC CE indicating mobility information for the set of cells; and code 1318 for communicating with the UE via a subset of the cells that are activated with one or more features of the set of cells based on the MAC CE. In certain aspects, the processor 1304 has circuitry configured to implement the code stored in the computer-readable medium/memory 1312. The processor 1304 includes circuitry 1320 for sending a UE RRC signaling indicating a set of cells that support PHY layer or MAC layer mobility signaling; circuitry 1322 for sending the UE at least one MAC CE indicating mobility information for the set of cells; and circuitry 1324 for communicating with the UE via a subset of the cells that are activated with one or more features of the set of cells based on the MAC CE.

Example Aspects

Aspect 1: A method for wireless communications by a user equipment (UE), comprising receiving radio resource control (RRC) signaling indicating a set of cells that support physical (PHY) layer or medium access control (MAC) layer mobility signaling, receiving at least one MAC control element (CE) indicating mobility information for the set of cells, and updating one or more features of the set of cells based on the MAC CE.

Aspect 2: The method of Aspect 1, wherein the set of cells are supported by one or more distributed units (DUs) under a common central unit (CU).

Aspect 3: The method of Aspect 2, wherein the one or more DUs comprises a common DU that supports each cell of the set of cells.

Aspect 4: The method of any of Aspects 1-2, wherein the MAC CE indicates at least one of an identifier (ID) of a cell of the set of cells to be activated to serve the UE that is not currently in the a subset of the set of cells that are activated for serving the UE; or an ID of one of the cells in the subset of cells that is to be removed from the subset and de-activated from serving the UE.

Aspect 5: The method of Aspect 4, wherein the MAC CE comprises a field that points to the ID of the cell to be activated or deactivated in a table or list configured by the RRC signaling or a bitmap with bit locations that correspond to the ID of the cell to be activated or deactivated in a table or list configured by the RRC signaling.

Aspect 6: The method of any of Aspects 1-3, wherein the MAC CE indicates an update to System Information (SI) for one or more of the cells in the set.

Aspect 7: The method of Aspect 6, wherein the RRC signaling configures one or more sets of SI values and the MAC CE indicates the update to SI by at least one of deactivating or activating one or more of the sets of SI values.

Aspect 8: The method of any of Aspects 1-7, wherein one or more SI information elements (IEs) eligible for updating via the MAC CE occur in a predefined order and are addressed based on at least one of numbering or a bitmap in the MAC CE.

Aspect 9: The method of any of Aspects 1-8, wherein the RRC signaling indicates one or more sets of options for cells in the set and the MAC CE activates one or more sets of options for a cell upon activation.

Aspect 10: The method of Aspect 9, wherein at least some of the options relate to: a timing advance group (TAG) timing advance (TA) information, a measurement configuration, or and update or change to a primary cell (PCell).

Aspect 11: The method of any of Aspects 1-10, wherein a format of the MAC CE depends, at least in part, on a type or types of information conveyed.

Aspect 12: The method of any of Aspects 1-11, wherein the MAC CE is received without data.

Aspect 13: The method of any of Aspects 1-12, further comprising signaling an acknowledgment of the at least one MAC CE.

Aspect 14: The method of Aspect 13, wherein the acknowledgement is signaled via at least one of a hybrid automatic repeat request (HARM) Acknowledgment, a MAC CE, or a physical uplink control channel (PUCCH) with a cyclic redundancy check (CRC) that indicates the acknowledgment.

Aspect 15: The method of any of Aspects 1-14, further comprising transmitting, to the UE, at least one downlink control information (DCI) indicating mobility information for the set of cells.

Aspect 16: A method for wireless communications by a network entity, comprising sending a user equipment (UE) radio resource control (RRC) signaling indicating a set of cells that support physical (PHY) layer or medium access control (MAC) layer mobility signaling sending the UE at least one MAC control element (CE) indicating mobility information for the set of cells and communicating with the UE via a subset of the cells that are activated with one or more features of the set of cells based on the MAC CE.

Aspect 17: The method of Aspect 16, wherein the set of cells are supported by one or more distributed units (DUs) under a common central unit (CU).

Aspect 18: The method of Aspect 17, wherein the one or more DUs comprises a common DU that supports each cell of the set of cells.

Aspect 19: The method of any of Aspects 16-18, wherein the MAC CE indicates at least one of an identifier (ID) of a cell of the set of cells to be activated to serve the UE that is not currently in the a subset of the set of cells that are activated for serving the UE; or an ID of one of the cells in the subset of cells that is to be removed from the subset and de-activated from serving the UE.

Aspect 20: The method of Aspect 19, wherein the MAC CE comprises a field that points to the ID of the cell to be activated or deactivated in a table or list configured by the RRC signaling or a bitmap with bit locations that correspond to the ID of the cell to be activated or deactivated in a table or list configured by the RRC signaling.

Aspect 21: The method of any of Aspects 16-20, wherein the MAC CE indicates an update to System Information (SI) for one or more of the cells in the set.

Aspect 22: The method of Aspect 21, wherein the RRC signaling configures one or more sets of SI values and the MAC CE indicates the update to SI by at least one of deactivating or activating one or more of the sets of SI values.

Aspect 23: The method of any of Aspects 16-22, wherein one or more SI information elements (IEs) eligible for updating via the MAC CE occur in a predefined order and are addressed based on at least one of numbering or a bitmap in the MAC CE.

Aspect 24: The method of any of Aspects 16-23, wherein the RRC signaling indicates one or more sets of options for cells in the set and the MAC CE activates one or more sets of options for a cell upon activation.

Aspect 25: The method of Aspect 24, wherein at least some of the options relate to: a timing advance group (TAG) timing advance (TA) information, a measurement configuration, or and update or change to a primary cell (PCell).

Aspect 26: The method of any of Aspects 16-25, wherein a format of the MAC CE depends, at least in part, on a type or types of information conveyed.

Aspect 27: The method of any of Aspects 16-26, wherein the MAC CE is received without data.

Aspect 28: The method of any of Aspects 16-27, further comprising receiving, from the UE, an acknowledgment of the at least one MAC CE and updating the one or more features of the set of cells only after receiving the acknowledgement.

Aspect 29: The method of Aspect 28, wherein the acknowledgement is received, from the UE, via at least one of a hybrid automatic repeat request (HARM) Acknowledgment, a MAC CE, or a physical uplink control channel (PUCCH) with a cyclic redundancy check (CRC) that indicates the acknowledgment.

Aspect 30: The method of any of Aspects 16-29, further comprising transmitting, to the UE, at least one downlink control information (DCI) indicating mobility information for the set of cells.

Aspect 31: An apparatus, comprising: a memory comprising executable instructions; and one or more processors configured to execute the executable instructions and cause the apparatus to perform a method in accordance with any one of Aspects 1-30.

Aspect 32: An apparatus, comprising means for performing a method in accordance with any one of Aspects 1-30.

Aspect 33: A non-transitory computer-readable medium comprising executable instructions that, when executed by one or more processors of an apparatus, cause the apparatus to perform a method in accordance with any one of Aspects 1-30.

Aspect 34: A computer program product embodied on a computer-readable storage medium comprising code for performing a method in accordance with any one of Aspects 1-30.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Some wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (e.g., looking up in a table, a database or another data structure), assuming and the like. Also, "determining" may include receiving (e.g., receiving information), accessing (e.g., accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 8 and 9 may be performed by various processors shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and 9.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
receiving radio resource control (RRC) signaling indicating a set of cells that support physical (PHY) layer or medium access control (MAC) layer mobility signaling;
receiving at least one MAC control element (CE) indicating mobility information for the set of cells; and
updating one or more features of the set of cells based on the MAC CE.

2. The method of claim 1, wherein the set of cells are supported by one or more distributed units (DUs) under a common central unit (CU).

3. The method of claim 2, wherein:
the one or more DUs comprises a common DU that supports each cell of the set of cells.

4. The method of claim 1, wherein the MAC CE indicates at least one of:
an identifier (ID) of a cell of the set of cells to be activated to serve the UE that is not currently in a subset of the set of cells that are activated for serving the UE; or
an ID of one of the cells in the subset of cells that is to be removed from the subset and de-activated from serving the UE.

5. The method of claim 4, wherein the MAC CE comprises:
a field that points to the ID of the cell to be activated or deactivated in a table or list configured by the RRC signaling; or
a bitmap with bit locations that correspond to the ID of the cell to be activated or deactivated in a table or list configured by the RRC signaling.

6. The method of claim 1, wherein the MAC CE indicates an update to System Information (SI) for one or more of the cells in the set.

7. The method of claim 6, wherein:
the RRC signaling configures one or more sets of SI values; and
the MAC CE indicates the update to SI by at least one of deactivating or activating one or more of the sets of SI values.

8. The method of claim 6, wherein one or more SI information elements (IEs) eligible for updating via the MAC CE occur in a predefined order and are addressed based on at least one of numbering or a bitmap in the MAC CE.

9. The method of claim 1, wherein:
the RRC signaling indicates one or more sets of options for cells in the set; and
the MAC CE activates one or more sets of options for a cell upon activation.

10. The method of claim 9, wherein at least some of the options relate to: a timing advance group (TAG) timing advance (TA) information, a measurement configuration, or and update or change to a primary cell (PCell).

11. The method of claim 1, wherein:
a format of the MAC CE depends, at least in part, on a type or types of information conveyed.

12. The method of claim 1, wherein the MAC CE is received without data.

13. The method of claim 1, further comprising signaling an acknowledgment of the at least one MAC CE.

14. The method of claim 13, wherein the acknowledgement is signaled via at least one of a hybrid automatic repeat request (HARM) acknowledgment, a MAC CE, or a physical uplink control channel (PUCCH) with a cyclic redundancy check (CRC) that indicates the acknowledgment.

15. The method of claim 1, further comprising receiving, from a network entity, at least one downlink control information (DCI) indicating mobility information for the set of cells.

16. A method for wireless communications by a network entity, comprising:
sending a user equipment (UE) radio resource control (RRC) signaling indicating a set of cells that support physical (PHY) layer or medium access control (MAC) layer mobility signaling;
sending the UE at least one MAC control element (CE) indicating mobility information for the set of cells; and
communicating with the UE via a subset of the cells that are activated with one or more features of the set of cells based on the MAC CE.

17. The method of claim 16, wherein the set of cells are supported by one or more distributed units (DUs) under a common central unit (CU).

18. The method of claim 17, wherein:
the one or more DUs comprises a common DU that supports each cell of the set of cells.

19. The method of claim 16, wherein the MAC CE indicates at least one of:
an identifier (ID) of a cell of the set of cells to be activated to serve the UE that is not currently in a subset of the set of cells that are activated for serving the UE; or
an ID of one of the cells in the subset of cells that is to be removed from the subset and de-activated from serving the UE.

20. The method of claim 19, wherein the MAC CE comprises:
a field that points to the ID of the cell to be activated or deactivated in a table or list configured by the RRC signaling; or
a bitmap with bit locations that correspond to the ID of the cell to be activated or deactivated in a table or list configured by the RRC signaling.

21. The method of claim 16, wherein the MAC CE indicates an update to System Information (SI) for one or more of the cells in the set.

22. The method of claim 21, wherein:
the RRC signaling configures one or more sets of SI values; and
the MAC CE indicates the update to SI by at least one of deactivating or activating one or more of the sets of SI values.

23. The method of claim 21, wherein one or more SI information elements (IEs) eligible for updating via the MAC CE occur in a predefined order and are addressed based on at least one of numbering or a bitmap in the MAC CE.

24. The method of claim 16, wherein:
the RRC signaling indicates one or more sets of options for cells in the set; and
the MAC CE activates one or more sets of options for a cell upon activation.

25. The method of claim 24, wherein at least some of the options relate to: a timing advance group (TAG) timing advance (TA) information, a measurement configuration, or and update or change to a primary cell (PCell).

26. The method of claim 16, wherein:
a format of the MAC CE depends, at least in part, on a type or types of information conveyed.

27. The method of claim 16, wherein the MAC CE is received without data.

28. The method of claim 16, further comprising:
receiving, from the UE, an acknowledgment of the at least one MAC CE; and
updating the one or more features of the set of cells only after receiving the acknowledgement.

29. An apparatus for wireless communications by a user equipment (UE), comprising:
a receiver configured to receive radio resource control (RRC) signaling indicating a set of cells that support physical (PHY) layer or medium access control (MAC) layer mobility signaling and at least one MAC control element (CE) indicating mobility information for the set of cells; and
at least one processor configured to update one or more features of the set of cells based on the MAC CE.

30. An apparatus for wireless communications by a network entity, comprising:
a transmitter configured to send a user equipment (UE) radio resource control (RRC) signaling indicating a set of cells that support physical (PHY) layer or medium access control (MAC) layer mobility signaling and to send the UE at least one MAC control element (CE) indicating mobility information for the set of cells; and
at least one processor configured to communicate with the UE via a subset of the cells that are activated with one or more features of the set of cells based on the MAC CE.

* * * * *